United States Patent
Xiao et al.

(10) Patent No.: US 9,743,329 B2
(45) Date of Patent: Aug. 22, 2017

(54) BASE STATION HANDOVER METHOD, X2 INTERFACE SETUP METHOD, BASE STATION, USER EQUIPMENT AND SYSTEM

(71) Applicant: Huawei Technologies Co., Ltd., Shenzhen (CN)

(72) Inventors: Dengkun Xiao, Beijing (CN); Jing Han, Beijing (CN); Yuxiang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 339 days.

(21) Appl. No.: 14/327,025

(22) Filed: Jul. 9, 2014

(65) Prior Publication Data
US 2014/0321433 A1    Oct. 30, 2014

Related U.S. Application Data (63) Continuation of application No. PCT/CN2013/070007, filed on Jan. 4, 2013.

(30) Foreign Application Priority Data

Jan. 10, 2012 (CN) .......................... 2012 1 0006111

(51) Int. Cl.
H04W 36/30 (2009.01)
H04W 36/00 (2009.01)
(Continued)

(52) U.S. Cl.
CPC ............. *H04W 36/30* (2013.01); *H04B 7/24* (2013.01); *H04W 36/0072* (2013.01); *H04W 92/20* (2013.01)

(58) Field of Classification Search
CPC .......... H04B 7/24; H04B 7/024; H04B 7/022; H04W 36/0072; H04W 36/30; H04W 92/20
See application file for complete search history.

(56) References Cited

U.S. PATENT DOCUMENTS 8,817,750 B2 *   8/2014   Choi-Grogan .... H04W 36/0083
                                                        370/331
2004/0202127 A1 * 10/2004 Loh ................... H04W 36/0072
                                                        370/331
(Continued)

FOREIGN PATENT DOCUMENTS

CN           101815328 A      8/2010
CN           101873666 A     10/2010
(Continued)

OTHER PUBLICATIONS

3rd Generation Partnership Project, Technical Specification Group Radio Access Network; Evolved Universal Terrestrial Radio Access (E-UTRA); Radio Resource Control (RRC); Protocol specification (Release 10), 3GPP TS 36.331, v10.4.0, Dec. 2011, 296 pages.
(Continued)

*Primary Examiner* — Dung B Huynh
(74) *Attorney, Agent, or Firm* — Slater Matsil, LLP (57) ABSTRACT

Embodiments of the present invention provide a base station handover method, an X2 interface setup method, a base station, a user equipment and a system. The method includes sending a handover request instruction to a second base station. The handover request instruction includes information of a first coordinated multi-point set of a user equipment. A handover request response is received from the second base station. The handover request response includes information of a second coordinated multi-point set allocated by the second base station for the user equipment. The information of the second coordinated multi-point set sent to the user equipment.

20 Claims, 7 Drawing Sheets

(51) Int. Cl.
*H04B 7/24* (2006.01)
*H04W 92/20* (2009.01)

(56) References Cited

U.S. PATENT DOCUMENTS

| | | | | |
|---|---|---|---|---|
| 2007/0238463 A1* | 10/2007 | Ogami | H04W 36/0033 | 455/436 |
| 2009/0111470 A1* | 4/2009 | Thakare | H04W 36/0055 | 455/436 |
| 2010/0173660 A1* | 7/2010 | Liu | H04W 48/16 | 455/501 |
| 2010/0239036 A1* | 9/2010 | Koo | H04B 7/024 | 375/260 |
| 2010/0261482 A1* | 10/2010 | Guey | H04B 7/024 | 455/452.2 |
| 2010/0272067 A1* | 10/2010 | Lu | H04W 36/0072 | 370/331 |
| 2011/0034171 A1* | 2/2011 | Choi | H04B 7/024 | 455/436 |
| 2011/0111753 A1* | 5/2011 | Vainikka | H04W 36/32 | 455/425 |
| 2011/0170422 A1 | 7/2011 | Hu et al. | | |
| 2011/0170516 A1 | 7/2011 | Hu et al. | | |
| 2011/0183669 A1* | 7/2011 | Kazmi | H04W 36/0083 | 455/434 |
| 2011/0210845 A1* | 9/2011 | Xiong | H04W 60/00 | 340/539.13 |
| 2011/0237272 A1* | 9/2011 | Gorokhov | H04B 7/024 | 455/452.1 |
| 2011/0281585 A1 | 11/2011 | Kwon et al. | | |
| 2012/0002643 A1* | 1/2012 | Chung | H04J 11/0093 | 370/331 |
| 2012/0127908 A1* | 5/2012 | Gao | H04W 72/042 | 370/312 |
| 2012/0202431 A1* | 8/2012 | Hawryluck | H04B 7/024 | 455/63.4 |
| 2012/0230274 A1* | 9/2012 | Xiao | H04B 7/024 | 370/329 |
| 2012/0282964 A1* | 11/2012 | Xiao | H04B 7/024 | 455/515 |
| 2012/0302240 A1* | 11/2012 | Tamaki | H04W 36/0011 | 455/436 |
| 2013/0003948 A1 | 1/2013 | Milstein et al. | | |
| 2013/0017833 A1 | 1/2013 | Sakamoto et al. | | |
| 2013/0088986 A1* | 4/2013 | Xiao | H04W 72/0426 | 370/252 |
| 2013/0128866 A1* | 5/2013 | Zhang | H04W 12/06 | 370/331 |
| 2014/0003327 A1* | 1/2014 | Seo | H04W 36/08 | 370/315 |
| 2014/0198744 A1* | 7/2014 | Wang | H04B 7/0617 | 370/329 |
| 2015/0036658 A1* | 2/2015 | Mochizuki | H04W 24/10 | 370/331 |
| 2016/0183275 A1* | 6/2016 | Inoue | H04B 7/0695 | 455/450 |

FOREIGN PATENT DOCUMENTS

| | | |
|---|---|---|
| CN | 101873675 A | 10/2010 |
| CN | 101932050 A | 12/2010 |
| CN | 102625383 A | 8/2012 |
| EP | 2306769 A1 | 4/2011 |
| EP | 2337400 A1 | 6/2011 |
| EP | 2408230 A1 | 1/2012 |
| WO | 2011002374 A1 | 1/2011 |
| WO | 2011105145 A1 | 9/2011 |
| WO | 2011152347 A1 | 12/2011 |

OTHER PUBLICATIONS

3rd Generation Partnership Project, Technical Specification Group Radio Access Network; Evolved Universal Terrestrial Radio Access Network (E-UTRAN); X2 application protocol (X2AP) (Release 10), 3GPP TS 36.423, v10.4.0, Dec. 2011, 132 pages.

* cited by examiner

BASE STATION HANDOVER METHOD, X2 INTERFACE SETUP METHOD, BASE STATION, USER EQUIPMENT AND SYSTEM

This application is a continuation of International Application No. PCT/CN2013/070007, filed on Jan. 4, 2013, which claims priority to Chinese Patent Application No. 201210006111.4, filed on Jan. 10, 2012, both of which are hereby incorporated by reference in their entireties.

TECHNICAL FIELD

The present invention relates to the field of communications technologies and, in particular embodiments, to a base station handover method, an X2 interface setup method, a base station, a user equipment and a system.

BACKGROUND

In a next generation mobile communication system, i.e., a long term evolution-advanced (LTE-A) system, a coordinated multi-point transmission/reception (CoMP) technology can be used to increase the coverage of a high data rate, so as to raise the throughput at a node edge on a network side and increase the throughput of the system. Therefore, when a user equipment (UE) is located at the network edge, the CoMP technology needs to be used for transmission of some services.

The CoMP technology refers to separating multiple transmissions at geographic locations and coordinately participating in data transmission or reception of a user equipment. In the prior art, when a user equipment is handed over between two base stations (eNB), according to an original handover process, when the UE is handed over from the source eNB to the target eNB, the target eNB cannot immediately adopt the CoMP technology for the UE. Therefore, the reception of high data volume services of the UE, the success ratio of the handover of the user equipment and the throughput of the system will be affected.

SUMMARY

Embodiments of the present invention provide a base station handover method, an X2 interface setup method, a base station, a user equipment and a system, so that the user equipment can immediately adopt the CoMP technology after completing handover, thereby raising the success ratio of the handover and the system throughput.

In order to achieve the objective, the embodiments of the present invention adopt the following technical solutions:

According to one aspect, a base station handover method is provided, which is based on one side of a first base station. A handover request instruction is sent to a second base station. The handover request instruction includes information of a first coordinated multi-point set of a user equipment, so that the second base station allocates a second coordinated multi-point set for the user equipment according to the information of the first coordinated multi-point set. A handover request response is received from the second base station. The handover request response includes information of the second coordinated multi-point set allocated by the second base station for the user equipment. The information of the second coordinated multi-point set is sent to the user equipment, so that the user equipment accesses the second coordinated multi-point set after handover.

A base station handover method is further provided, which is based on one side of a second base station. A handover request instruction is received from a first base station. The handover request instruction includes information of a first coordinated multi-point set of a user equipment, so as to allocate a second coordinated multi-point set for the user equipment according to the information of the first coordinated multi-point set up. A handover request response is sent to the first base station. The handover request response includes information of the second coordinated multi-point set allocated for the user equipment.

A base station handover method is further provided, which is based on one side of a user equipment. The method includes receiving, from a second base station, information of a second coordinated multi-point set, which is allocated by the second base station according to information of a first coordinated multi-point set, so that the user equipment accesses the second coordinated multi-point set after handover. The method further includes handing over to the second base station, and according to the information of the second coordinated multi-point set, accessing the second coordinated multi-point set.

According to another aspect, an X2 interface setup method is provided, which is based on one side of a first base station. An X2 interface setup request instruction is sent to a second base station. The X2 interface setup request instruction includes information of all coordinated multi-point sets in the first base station. An X2 interface setup request response is received from the second base station, where the X2 interface setup request response includes information of all coordinated multi-point sets in the second base station.

An X2 interface setup method is further provided, which is based on one side of a first base station. An X2 interface setup request instruction is received from the first base station. The X2 interface setup request instruction includes information of all coordinated multi-point sets in the first base station. An X2 interface setup request response is sent to the first base station. The X2 interface setup request response includes information of all coordinated multi-point sets in a second base station.

According to another aspect, a first base station is further provided. A first transmitting unit is configured to send a handover request instruction to a second base station, where the handover request instruction includes information of a first coordinated multi-point set of a user equipment, so that the second base station allocates a second coordinated multi-point set for the user equipment according to the information of the first coordinated multi-point set. A first receiving unit is configured to receive, from the second base station, a handover request response corresponding to the handover request instruction sent by the first transmitting unit. The handover request response includes information of the second coordinated multi-point set allocated by the second base station for the user equipment. A second transmitting unit is configured to send the information of the second coordinated multi-point set to the user equipment, so that the user equipment accesses the second coordinated multi-point set after handover.

A second base station is further provided. A second receiving unit is configured to receive a handover request instruction from a first base station. The handover request instruction includes information of a first coordinated multi-point set of a user equipment, so as to allocate a second coordinated multi-point set for the user equipment according to the information of the first coordinated multi-point set. A third transmitting unit, configured to send a handover request response to the first base station. The handover request response includes information of the second coordinated multi-point set allocated for the user equipment.

A user equipment is further provided. A third receiving unit is configured to receive, from a second base station, information of a second coordinated multi-point set, which is allocated by the second base station according to information of a first coordinated multi-point set, so that the user equipment accesses the second coordinated multi-point set after handover. An execution unit is configured to be handed over to the second base station, and according to the information of the second coordinated multi-point set, to access the second coordinated multi-point set.

A base station handover system is further provided, which includes the first base station, the second base station and the user equipment.

According to still another aspect, a first base station is further provided. A first setup request sub-unit is configured to send an X2 interface setup request instruction to a second base station. The X2 interface setup request instruction includes information of all coordinated multi-point sets in the first base station. A first setup response sub-unit is configured to receive, from the second base station, an X2 interface setup request response corresponding to the setup request instruction sent by the first setup request sub-unit. The X2 interface setup request response includes information of all coordinated multi-point sets in the second base station.

A second base station is further provided. A second setup request sub-unit is configured to receive an X2 interface setup request instruction from a first base station. The X2 interface setup request instruction includes information of all coordinated multi-point sets in the first base station. A second setup response sub-unit, configured to send, to the first base station, an X2 interface setup request response corresponding to the setup request instruction received by the second setup request sub-unit. The X2 interface setup request response includes information of all coordinated multi-point sets in the second base station.

In the base station handover method, the X2 interface setup method, the base station, the user equipment and the system provided by the embodiments of the present invention, a target base station receives information of a current first coordinated multi-point set of a user equipment and allocates, according to the information, a new second coordinated multi-point set for the user equipment, so that the user equipment can immediately adopt the coordinated multi-point technology (namely, CoMP technology) after completing handover, thereby raising the success ratio of the handover and the system throughput.

BRIEF DESCRIPTION OF THE DRAWINGS

To illustrate the technical solutions according to the embodiments of the present invention or in the prior art more clearly, the following briefly introduces accompanying drawings required for describing the embodiments or the prior art. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF ILLUSTRATIVE EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
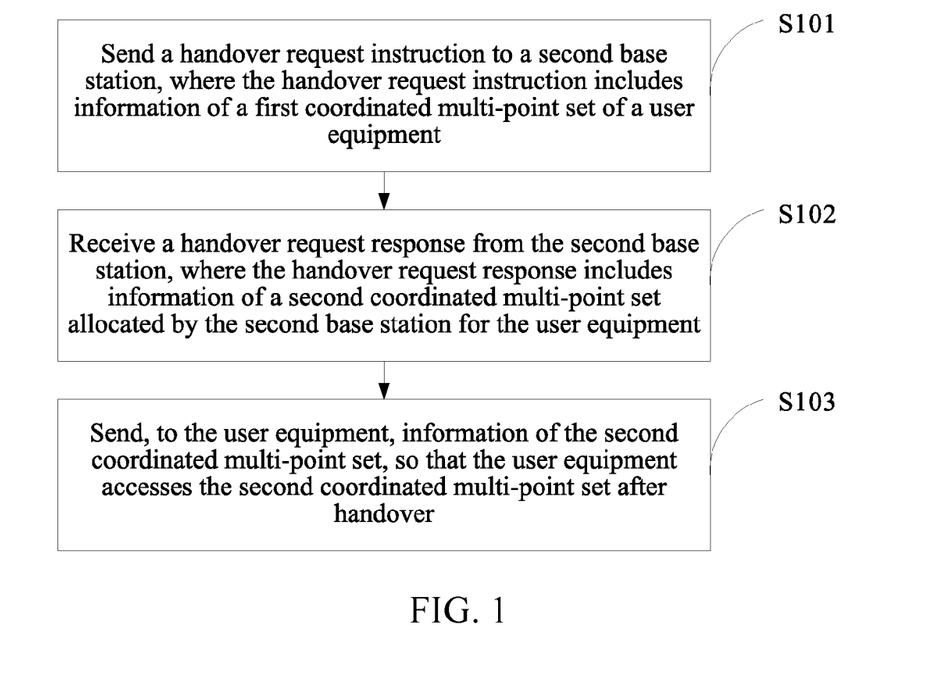
FIG. 1 is a schematic flow chart 1 of a handover method provided by Embodiment 1 of the present invention.

An embodiment of the present invention provides a base station handover method, which is applied to one side of a first base station and, as shown in FIG. 1, includes the following steps.

S101. Send a handover request instruction to a second base station, where the handover request instruction includes information of a first coordinated multi-point set of a user equipment, so that the second base station allocates a second coordinated multi-point set for the user equipment according to the information of the first coordinated multi-point set.

S102. Receive a handover request response from the second base station, where the handover request response includes information of the second coordinated multi-point set allocated by the second base station for the user equipment.

S103. Send the information of the second coordinated multi-point set to the user equipment, so that the user equipment accesses the second coordinated multi-point set after handover.

Figure 2:
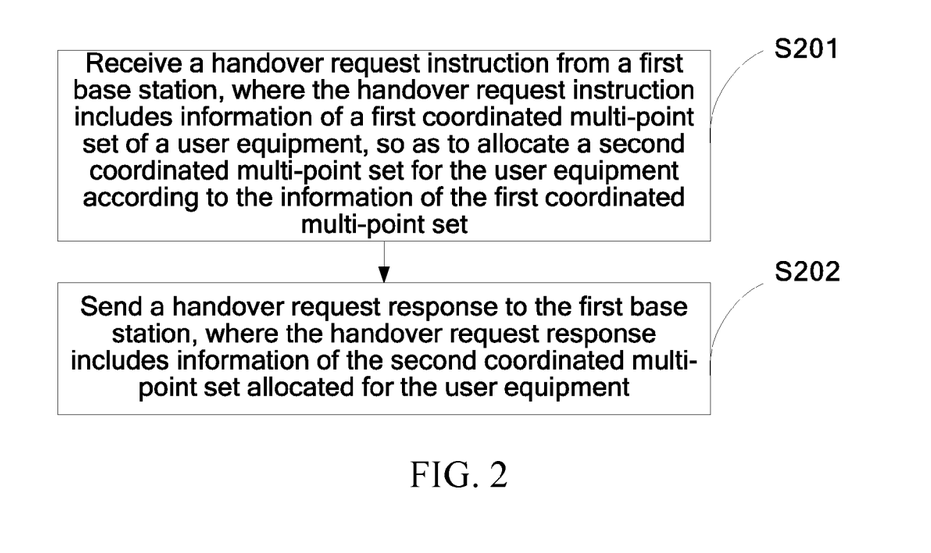
FIG. 2 is a schematic flow chart 2 of a handover method provided by Embodiment 1 of the present invention.

An embodiment of the present invention further provides a base station handover method, which is applied to one side of a second base station and, as shown in FIG. 2, includes:

S201. Receive a handover request instruction from a first base station, where the handover request instruction includes information of a first coordinated multi-point set of a user equipment, so as to allocate a second coordinated multi-point set for the user equipment according to the information of the first coordinated multi-point set.

S202. Send a handover request response to the first base station, where the handover request response includes information of the second coordinated multi-point set allocated for the user equipment.

Figure 3:
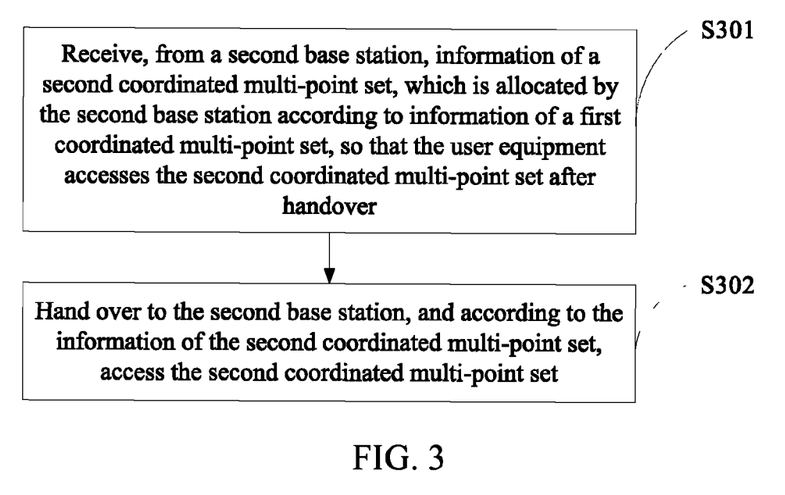
FIG. 3 is a schematic flow chart 3 of a handover method provided by Embodiment 1 of the present invention.

An embodiment of the present invention provides another handover method, which is applied to a user equipment and, as shown in FIG. 3, includes the following steps.

S301. Receive, from a second base station, information of a second coordinated multi-point set, which is allocated by the second base station according to information of a first coordinated multi-point set, so that the user equipment accesses the second coordinated multi-point set after handover.

S302. Hand over to the second base station, and according to the information of the second coordinated multi-point set, access the second coordinated multi-point set.

In the base station handover method provided by the embodiment of the present invention, a target base station receives information of a current first coordinated multi-point set of a user equipment and allocates, according to the information, a new second coordinated multi-point set for the user equipment, so that the user equipment can immediately adopt the coordinated multi-point technology after completing handover, thereby raising the success ratio of the handover and the system throughput.

Embodiment 2

Figure 4:
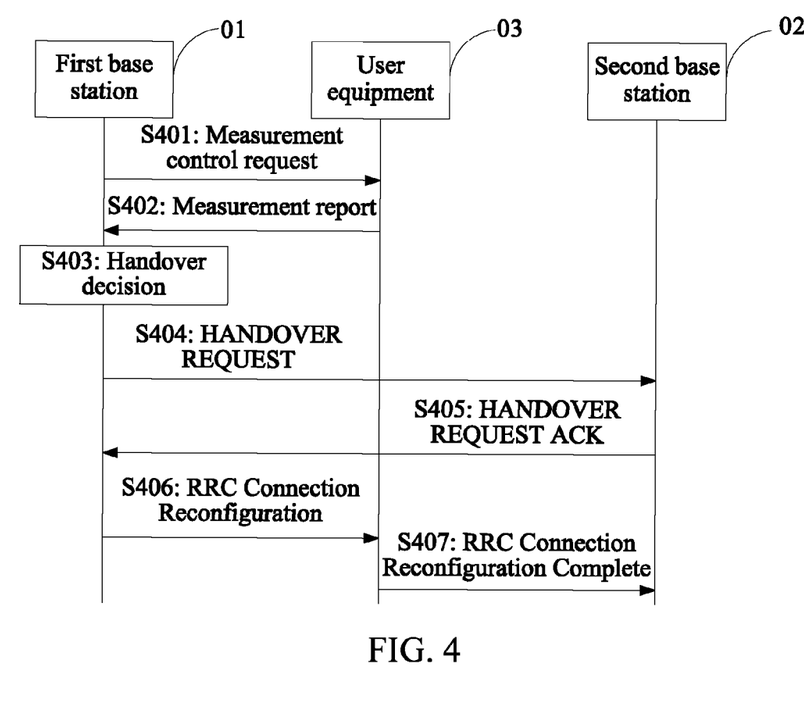
FIG. 4 is a schematic flow chart 4 of a handover method provided by Embodiment 2 of the present invention.

An embodiment of the present invention provides a base station handover method, and as shown in FIG. 4, when a user equipment 03 is to be handed over from a first base station 01 to a second base station 02, i.e., the first base station 01 serves as a source base station (Source eNB) and the second base station 02 serves as a target base station (Target eNB), the method includes the following steps.

S401. The first base station 01 sends a measurement control request to the user equipment 03 through an air interface.

S402. The user equipment 03 receives the measurement control request, and returns a measurement report to the first base station 01 through the air interface.

S403. The first base station 01 performs handover decision according to the received measurement report, to decide whether the user equipment 03 is handed over to the second base station 02.

S404. The first base station 01 sends a handover request instruction handover request to the second base station 02, where the information adopts the format of a protocol TS36.423. Information of a CoMP set currently accessed by the user equipment 03, i.e., UE CoMP Information, is added to the handover request. Exemplarily, the handover request added with the UE CoMP Information is shown in Table 1.

TABLE 1

HANDOVER REQUEST

| IE/Group Name | Presence | Range | IE type and reference | Semantics description | Criticality | Assigned Criticality |
|---|---|---|---|---|---|---|
| Message Type | M | | 9.2.13 | | YES | reject |
| ... | ... | ... | ... | ... | ... | ... |
| UE Context Information | | 1 | | | YES | reject |
| >MME UE S1AP ID | M | | INTEGER (0..232 − 1) | MME UE S1AP ID allocated at the MME | — | — |
| >UE Security Capabilities | M | | 9.2.29 | | — | — |
| >AS Security Information | M | | 9.2.30 | | — | — |
| >UE CoMP information | O/M | | | | | |
| ... | ... | ... | ... | ... | ... | ... |

Specifically, the information of the CoMP set currently accessed by the user equipment, i.e., the UE CoMP Information, includes identification information and maximum transmission power of each cell that constitutes the CoMP set. After receiving the handover request, the second base station 02 may determine a general moving direction of the user equipment 03 according to the identification information of each cell of the CoMP set, and reasonably allocate a new CoMP set for the user equipment 03 according to an interference condition and a resource allocation condition in the moving direction; and the second base station 02 may further allocate downlink power for each cell of the new CoMP set according to the maximum transmission power of each cell. In this manner, unnecessary interference of the user equipment 03 is avoided, so that the success ratio of the handover is raised, the resource utilization of the system becomes more reasonable, and the system throughput is increased.

The identification information of each cell includes an ID of the cell and may further include coordinates of the cell; or, includes coordinates of a remote radio head (RRH) and may further include an ID of the RRH. The information in the UE CoMP Information also adopts the format of the protocol TS36.423, and is exemplarily shown in Table 2.

TABLE 2

UE COMP INFORMATION

| IE/Group Name | Presence | Range | IE type and reference | Semantics description | Criticality | Assigned Criticality |
|---|---|---|---|---|---|---|
| UE CoMP information | O/M | 1 ... <max CompCell Number> | | UE CoMP set information | — | — |
| >UE connecting cell id | O/M | | | cell id which UE is connected | | |
| >Maximum transmission power | O/M | | | The maximum transmit power of the cell which is in UE CoMP set | | |
| >coordinate | O/M | | | The coordinate of the cell which is in UE CoMP set | | |

S405. The second base station 02 sends a handover request instruction handover request ACK to the first base station 01, where the information adopts the format of the protocol TS36.423. Information of a new CoMP set to be accessed by the user equipment 03, i.e., a new UE CoMP set, is added in the handover request ACK. Exemplarily, the handover request ACK added with the New UE CoMP set is shown in Table 3.

TABLE 3

HANDOVER REQUEST ACK

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UEX2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | ignore |
| New UE CoMP set | O/M | 1 ... <max CompCell Number> | | Cell id | Yes | ignore |
| ... | ... | ... | ... | ... | ... | ... |

Specifically, the information of the CoMP set to be accessed by the user equipment 03, i.e., the New UE CoMP set, includes identification information and maximum transmission power (Max Transmission Power) of each cell that constitutes the CoMP set, where the identification information of each cell includes an ID of the cell and may further include coordinates of the cell; or, includes coordinates of a remote radio head RRH and may further include an ID of the RRH. The information in the New UE CoMP set also adopts the format of the protocol TS36.423, and is exemplarily shown in Table 4.

TABLE 4

NEW UE COMP SET

| IE/Group Name | Presence | Range | IE type and reference | Semantics description | Criticality | Assigned Criticality |
|---|---|---|---|---|---|---|
| New UE CoMP set | O/M | 1 ... <max CompCell Number> | | UE CoMP set information | — | — |
| >UE connecting cell id | O/M | | | cell id which UE is connected | | |
| >Maximum transmission power | O/M | | | The maximum transmit power of the cell which is in UE CoMP set | | |

S406. The first base station 01 sends an RRC (radio resource control) connection reconfiguration instruction RRC Connection Reconfiguration to the user equipment 03, where the instruction adopts the format of a protocol TS36.331. The information of the new CoMP set allocated by the second base station 02 for the user equipment 03, i.e., the New UE CoMP set, is added in the RRC Connection Reconfiguration. The original RRC Connection Reconfiguration is shown in Table 5, and exemplarily, the RRC Connection Reconfiguration added with the New UE CoMP set is shown in Table 6.

TABLE 5

| RRC CONNECTION RECONFIGURATION |
| --- |
| RRCConnectionReconfiguration-v10xy-IEs ::= SEQUENCE {<br>   sCellToReleaseList-r10   SCellToReleaseList-r10   OPTIONAL, -- Need ON<br>   sCellToAddModList-r10   SCellToAddModList-r10   OPTIONAL, -- Need ON<br>   nonCriticalExtension   SEQUENCE { }   OPTIONAL -- Need OP<br>} |

TABLE 6

| RRC CONNECTION RECONFIGURATION |
| --- |
| RRCConnectionReconfiguration-v10xy-IEs ::= SEQUENCE {<br>   sCellToReleaseList-r10   SCellToReleaseList-r10   OPTIONAL, -- Need ON<br>   Compsetinfo-r10   Compsetinfo-r10<br>   sCellToAddModList-r10   SCellToAddModList-r10   OPTIONAL, -- Need ON<br>   nonCriticalExtension   SEQUENCE { }   OPTIONAL -- Need OP<br>}<br>Compsetinfo-r10::=   SEQUENCE (SIZE (1..maxCell-r10)) OF CellToAddMod-r10<br>SCellToAddMod-r10 ::=   SEQUENCE {<br>   sCellIndex-r10   SCellIndex-r10,<br>   cellIdentification   SEQUENCE {<br>      physCellId-r10   PhysCellId, --optional<br>      dl-CarrierFreq   ARECN-ValueEUTRA<br>   MAXtranspower<br>   coordinate<br>   }   OPTIONAL, --<br>Cond comp |

As shown in Table 6, the New UE CoMP set includes the identification information and maximum transmission power of each cell in the new CoMP set of the user equipment 03. The identification information of each cell includes an ID of the cell and may further include coordinates of the cell; or, includes coordinates of a remote radio head RRH and may further include an ID of the RRH.

The user equipment 03 receives the RRC Connection Reconfiguration and then performs handover, i.e., the user equipment 03 is handed over from the first base station 01 to the second base station 02, and does not need to blindly search for a proper cell after being handed over to the second base station 02; instead, the user equipment 03 can rapidly access a cell allocated by the second base station 02 for the user equipment 03 merely according to the identification information of each cell in the New UE CoMP set. Therefore, the success ratio of the handover is increased, and the time spent on the handover is saved, thereby raising the handover efficiency and increasing the system throughput. The user equipment 03 further acquires, according to the maximum transmission power of each cell in the new CoMP set, the downlink power allocated by the second base station 02 for each cell of the CoMP set, which facilitates reasonable allocation of the resources, raises the resource utilization rate, and further raises the system throughput.

S407. The user equipment 03 sends an RRC connection reconfiguration complete instruction RRC Connection Reconfiguration Complete to the second base station 02 to indicate that the handover of the user equipment is completed.

In the base station handover method provided by the embodiment of the present invention, a target base station receives information of a current first CoMP set of a user equipment and allocates, according to the information, a new second CoMP set for the user equipment, so that the user equipment can immediately adopt the CoMP technology after completing handover, and avoids unnecessary interference during the handover process; therefore, the success ratio of the handover and the handover efficiency are raised, the resource utilization rate is raised, and the system throughput is raised.

Embodiment 3

Figure 5:
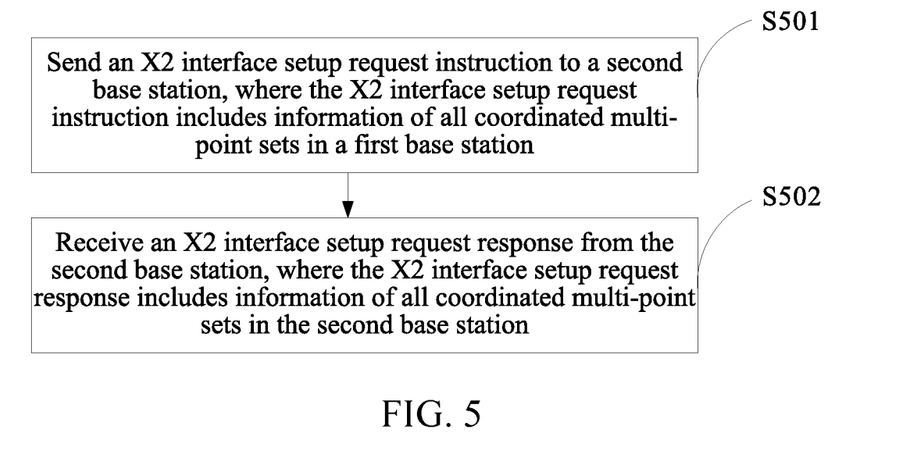
FIG. 5 is a schematic flow chart 1 of an X2 interface setup method provided by Embodiment 3 of the present invention.

An embodiment of the present invention provides an X2 interface setup method, which, based on one side of a first base station and as shown in FIG. 5, includes:

S501. Send an X2 interface setup request instruction to a second base station, where the X2 interface setup request instruction includes information of all coordinated multi-point sets in the first base station.

S502. Receive an X2 interface setup request response from the second base station, where the X2 interface setup request response includes information of all coordinated multi-point sets in the second base station.

Figure 6:
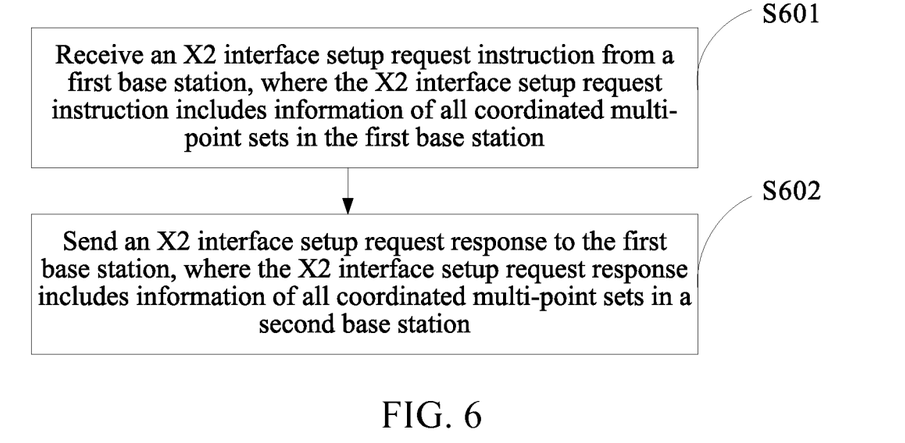
FIG. 6 is a schematic flow chart 2 of an X2 interface setup method provided by Embodiment 3 of the present invention.

An embodiment of the present invention provides an X2 interface setup method, which, based on one side of a second base station and as shown in FIG. 6, includes the following steps.

S601. Receive an X2 interface setup request instruction from a first base station, where the X2 interface setup request instruction includes information of all coordinated multi-point sets in the first base station.

S602. Send an X2 interface setup request response to the first base station, where the X2 interface setup request response includes information of all coordinated multi-point sets in the second base station.

In the X2 interface setup method provided by the embodiment of the present invention, information of coordinated multi-point sets is mutually provided through an X2 interface set up between the first base station and the second base station, which raises the utilization rate of system resources and increases the system throughput.

Embodiment 4

Figure 7:
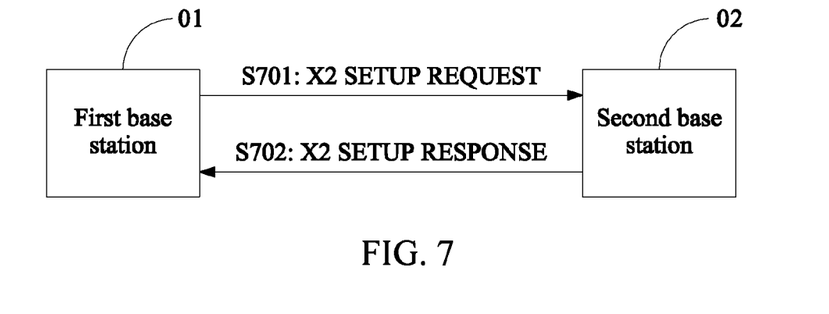
FIG. 7 is a schematic flow chart 3 of an X2 interface setup method provided by Embodiment 4 of the present invention.

An embodiment of the present invention provides an X2 interface setup method, which, as shown in FIG. 7, includes the following steps.

S701. The first base station 01 sends an X2 interface setup request instruction X2 setup request to the second base station 02, where the information adopts the format of the protocol TS36.423. Information of all CoMP sets in the first base station, i.e., eNB CoMP Information1 is added in the X2 setup request. Exemplarily, the X2 setup request added with the eNB CoMP Information1 is shown in Table 7.

TABLE 7

X2 SETUP REQUEST

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 ... <maxCellineNB> | | Complete list of cells served by the eNB | YES | reject |
| >Served Cell Information | M | | 9.2.8 | | — | — |
| >eNB CoMP information1 | O/M | | | | | |
| ... | ... | ... | ... | ... | ... | ... |

Specifically, the eNB CoMP Information1 of the first base station includes identification information and maximum transmission power (Max Transmission Power) of each cell that constitutes all the CoMP sets in the first base station. After receiving the X2 SETUP REQUEST, the second base station may perform interference coordination among the cells in the coverage of the second base station according to the information in the eNB CoMP Information1, thereby reducing the interference and increasing the system throughput.

The identification information of each cell includes an ID (Identification, identification) of the cell and may further include coordinates of the cell; or, includes coordinates (Coordination) of a remote radio head RRH (Remote Radio Head, RRH) and may further include an ID of the RRH. The information in the eNB CoMP Information1 also adopts the format of the protocol TS36.423, and is exemplarily shown in Table 8.

TABLE 8

ENB COMP INFORMATION

| IE/Group Name | Presence | Range | IE type and reference | Semantics description | Criticality | Assigned Criticality |
|---|---|---|---|---|---|---|
| eNB CoMP information | O/M | 1 ... <max CompCell Number> | | | | |
| >Intra-eNB CoMP set group | O/M | | | | — | — |
| >> cell id | O/M | integer 1~max | | | — | — |
| >> max transmission power | O/M | integer 1~max | | | — | — |
| >> coordination | O/M | | | | | |
| ... | ... | ... | ... | ... | ... | ... |

S702. The first base station 01 receives an X2 interface setup request response X2 SETUP RESPONSE returned by the second base station, to complete the setup of an X2 interface, where the information adopts the format of the protocol TS36.423. Information of all CoMP sets in the second base station, i.e., eNB CoMP Information2 is added in the X2 SETUP RESPONSE. Exemplarily, the X2 SETUP RESPONSE added with the eNB CoMP Information2 is shown in Table 9.

TABLE 9

X2 SETUP RESPONSE

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 ... <max CellineNB> | | Complete list of cells served by the eNB | YES | reject |
| >Served Cell Information | M | | 9.2.8 | | — | — |
| > eNB CoMP information2 | O/M | | | | | |
| ... | ... | ... | ... | ... | ... | ... |

Specifically, the eNB CoMP Information2 of the second base station includes identification information and maximum transmission power of each cell that constitutes all the CoMP sets in the second base station. After receiving the X2 SETUP REQUEST, the first base station may perform interference coordination among the cells in the coverage of the first base station according to the information in the eNB CoMP Information2, thereby reducing the interference and increasing the system throughput.

The identification information of each cell includes an ID of the cell and may further include coordinates of the cell; or, includes coordinates of a remote radio head RRH and may further include an ID of the RRH. The information in the eNB CoMP Information2 also adopts the format of the protocol TS36.423, and is exemplarily shown in Table 8.

Figure 8:
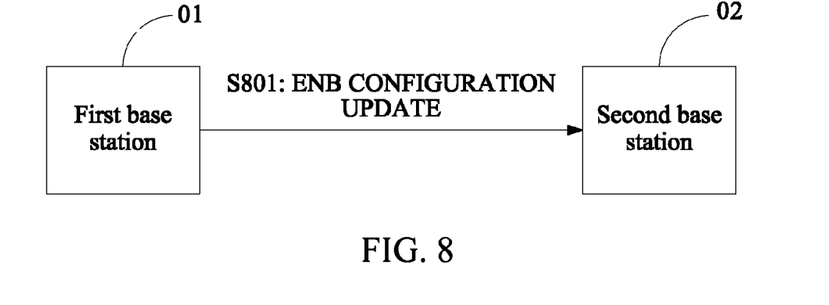
FIG. 8 is a schematic flow chart 4 of an X2 interface setup method provided by Embodiment 4 of the present invention.

When the configuration information of the first base station 01 is updated, the method, as shown in FIG. 8, further includes the following steps.

S801. The first base station 01 sends a configuration update instruction eNB configuration update to the second base station 02, where the information adopts the format of the protocol TS36.423. The updated information of all the CoMP sets in the first base station, i.e., eNB CoMP Information3, is added in the eNB configuration update. Exemplarily, the eNB configuration updateadded with the eNB CoMP Information3 is shown in Table 10.

TABLE 10

ENB CONFIGURATION UPDATE

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Add | | 0 . . . <max CellineNB> | | Complete list of added cells served by the eNB | GLOBAL | reject |
| >Served Cell Information | M | | 9.2.8 | | — | — |
| > eNB CoMP information | O/M | | | | | |
| . . . | . . . | . . . | . . . | . . . | . . . | . . . |

Specifically, the eNB CoMP Information3 of the first base station includes the updated identification information and maximum transmission power of each cell that constitutes all the CoMP sets in the first base station. After receiving the X2 setup request, the second base station may perform corresponding update on interference coordination among the cells in the coverage of the second base station according to the update information in the eNB CoMP Information3.

The identification information of each cell includes an ID of the cell and may further include coordinates of the cell; or, includes coordinates of a remote radio head RRH and may further include an ID of the RRH. The information in the eNB CoMP Information2 also adopts the format of the protocol TS36.423, and is exemplarily shown in Table 8.

The X2 interface, after being set up, can be used for the handover of the user equipment between the first base station and the second base station.

In the X2 interface setup method provided by the embodiment of the present invention, information of coordinated multi-point sets is mutually provided through an X2 interface set up between the first base station and the second base station, which raises the utilization rate of system resources and increases the system throughput.

Embodiment 5

Figure 9:
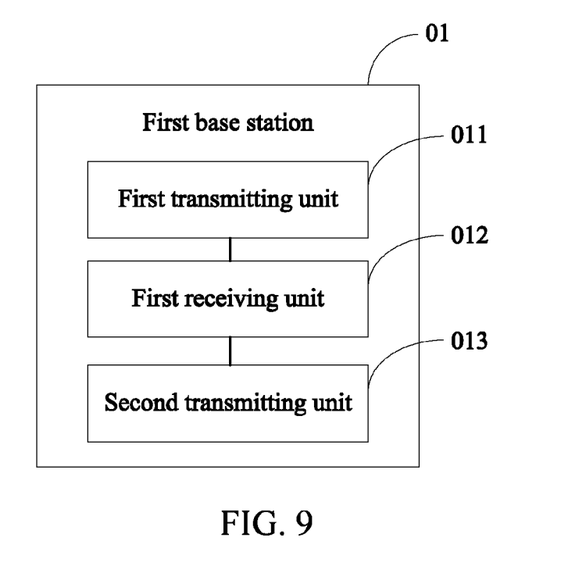
FIG. 9 is a schematic structural diagram 1 of a first base station provided by Embodiment 5 of the present invention.

An embodiment of the present invention provides the first base station 01, which, as shown in FIG. 9, includes a number of units.

A first transmitting unit 011 is configured to send a handover request instruction to a second base station, where the handover request instruction includes information of a first coordinated multi-point set of a user equipment, so that the second base station allocates a second coordinated multi-point set for the user equipment according to the information of the first coordinated multi-point set. A first receiving unit 012 is configured to receive, from the second base station, a handover request response corresponding to the handover request instruction sent by the first transmitting unit. The handover request response includes information of the second coordinated multi-point set allocated by the second base station for the user equipment. A second transmitting unit 013 is configured to send the information of the second coordinated multi-point set to the user equipment, so that the user equipment accesses the second coordinated multi-point set after handover.

In the first base station provided by the embodiment of the present invention, a target base station receives information of a current CoMP set of a user equipment and allocates, according to the information, a new CoMP set for the user equipment, so that the user equipment can immediately adopt the CoMP technology after completing handover, thereby raising the success ratio of the handover and the system throughput.

Embodiment 6

Figure 10:
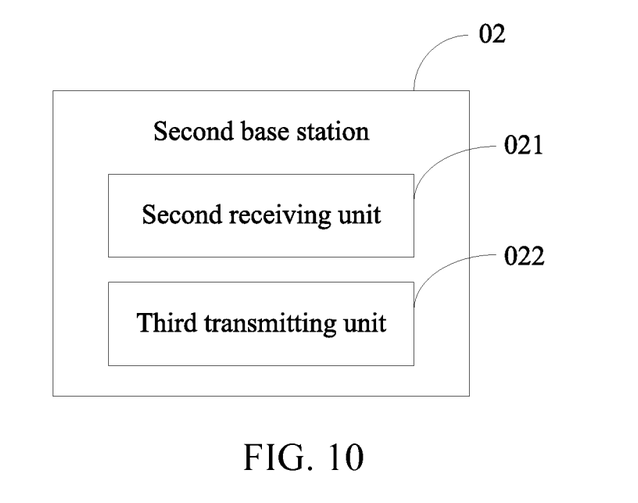
FIG. 10 is a schematic structural diagram 1 of a second base station provided by Embodiment 6 of the present invention.

An embodiment of the present invention provides the second base station 02, which, as shown in FIG. 10, includes a number of units.

A second receiving unit 021 is configured to receive a handover request instruction from a first base station, where the handover request instruction includes information of a first coordinated multi-point set of a user equipment, so as to allocate a second coordinated multi-point set for the user equipment according to the information of the first coordinated multi-point set. A third transmitting unit 022 is configured to send a handover request response to the first base station, where the handover request response includes information of the second coordinated multi-point set allocated for the user equipment.

In the first base station provided by the embodiment of the present invention, a target base station receives information of a current CoMP set of a user equipment and allocates, according to the information, a new CoMP set for the user equipment, so that the user equipment can immediately adopt the CoMP technology after completing handover, thereby raising the success ratio of the handover and the system throughput.

Embodiment 7

Figure 11:
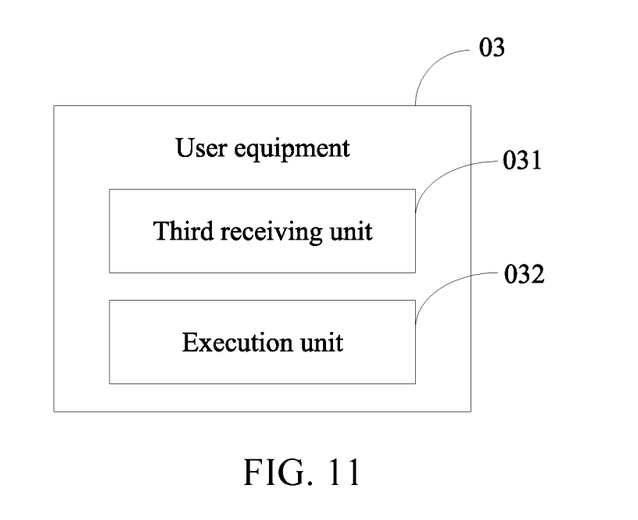
FIG. 11 is a schematic structural diagram of a user equipment provided by Embodiment 7 of the present invention.

An embodiment of the present invention provides the user equipment 03, which, as shown in FIG. 11, includes a number of units. A third receiving unit 031 is configured to receive, from a second base station, information of a second coordinated multi-point set, which is allocated by the second base station according to information of a first coordinated multi-point set, so that the user equipment accesses the second coordinated multi-point set after handover. An execution unit 032 is configured to be handed over to the second base station, and according to the information of the second coordinated multi-point set, access the second coordinated multi-point set.

In the user equipment provided by the embodiment of the present invention, a target base station receives information of a current CoMP set of a user equipment and allocates, according to the information, a new CoMP set for the user equipment, so that the user equipment can immediately adopt the CoMP technology after completing handover, thereby raising the success ratio of the handover and the system throughput.

Figure 12:
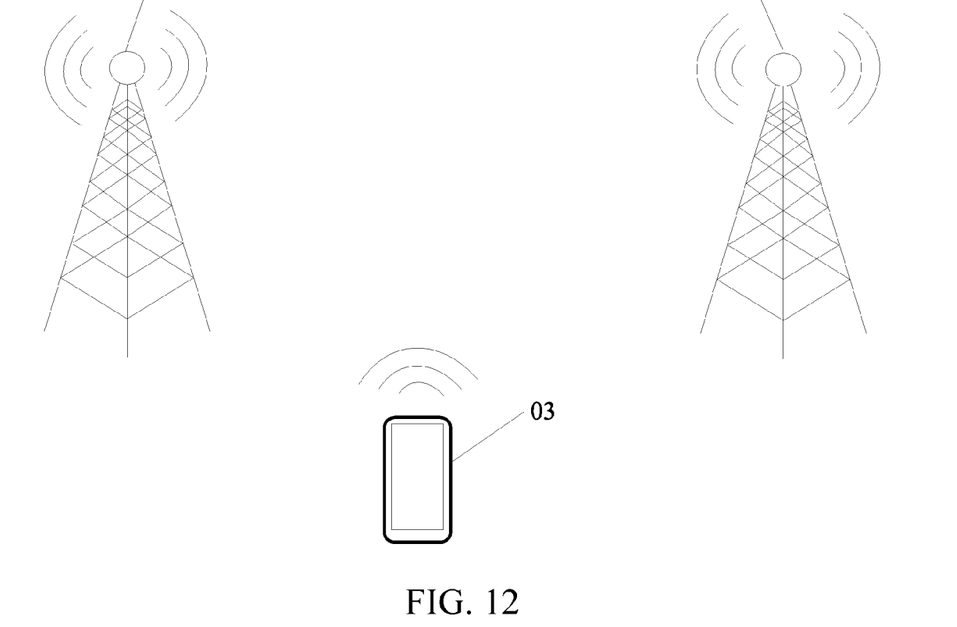
FIG. 12 is a schematic structural diagram of a base station handover system provided by an embodiment of the present invention.

An embodiment of the present invention further provides a base station handover system, which, as shown in FIG. 12, includes. The first base station 01 provided by Embodiment 5, the second base station 02 provided by Embodiment 6, and the user equipment 03 provided by Embodiment 7.

Embodiment 8

Figure 13:
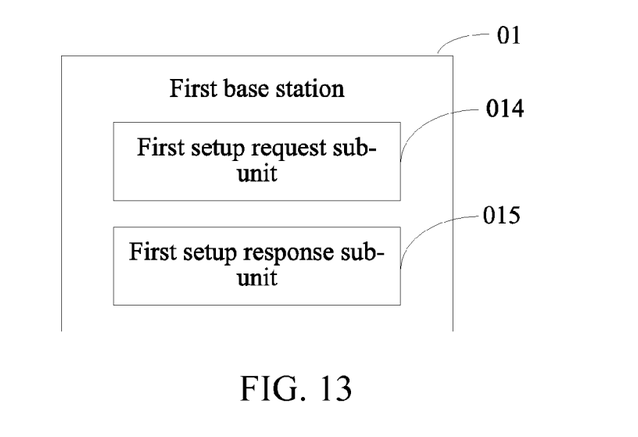
FIG. 13 is a schematic structural diagram 2 of a first base station provided by Embodiment 8 of the present invention.

An embodiment of the present invention provides the first base station 01, which, as shown in FIG. 13, includes a first setup request sub-unit 014, which is configured to send an X2 interface setup request instruction to a second base station. The X2 interface setup request instruction includes information of all coordinated multi-point sets in the first base station. The first base station 01 further includes a first setup response sub-unit 015, which is configured to receive, from the second base station, an X2 interface setup request response corresponding to the setup request instruction sent by the first setup request sub-unit. The X2 interface setup request response includes information of all coordinated multi-point sets in the second base station.

Figure 14:
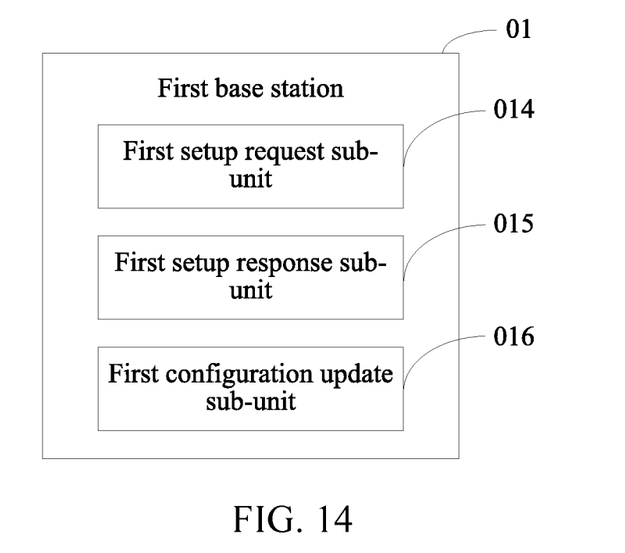
FIG. 14 is a schematic structural diagram 3 of a first base station provided by Embodiment 8 of the present invention.

As shown in FIG. 14, the first base station 01 further includes a first configuration update sub-unit 016, which is configured to when the configuration of the first base station is updated, send a base station configuration update instruction to the second base station. The base station configuration update instruction includes the updated information of all the coordinated multi-point sets in the first base station.

In the first base station provided by the embodiment of the present invention, information of coordinated multi-point sets is mutually provided through an X2 interface set up between the first base station and the second base station, which raises the utilization rate of system resources and increases the system throughput.

Embodiment 9

Figure 15:
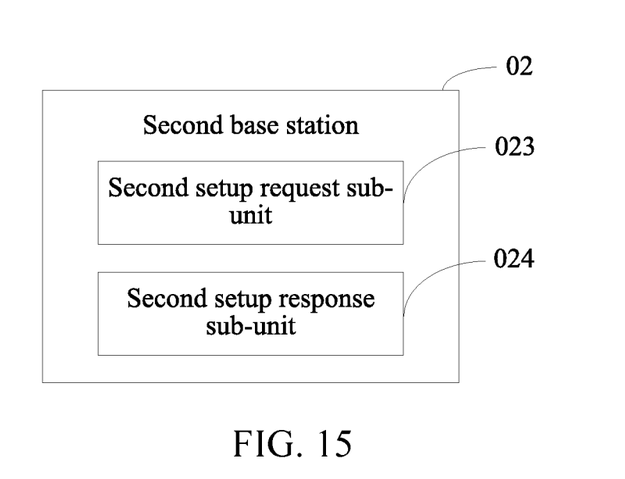
FIG. 15 is a schematic structural diagram 2 of a second base station provided by Embodiment 9 of the present invention.

An embodiment of the present invention provides the second base station 02, which, as shown in FIG. 15, includes a number of subunits. A second setup request sub-unit 023 is configured to receive an X2 interface setup request instruction from a first base station. The X2 interface setup request instruction includes information of all coordinated multi-point sets in the first base station. A second setup response sub-unit 024 is configured to send, to the first base station, an X2 interface setup request response corresponding to the setup request instruction received by the second setup request sub-unit. The X2 interface setup request response includes information of all coordinated multi-point sets in the second base station.

In the second base station provided by the embodiment of the present invention, information of coordinated multi-point sets is mutually provided through an X2 interface set up between the first base station and the second base station, which raises the utilization rate of system resources and increases the system throughput.

The above description is merely exemplary embodiments of the present invention, and is not intended to limit the protection scope of the present invention. Modifications or replacements that can be easily thought of by persons skilled in the art without departing from the technical scope of the present invention should be considered falling within the protection scope of the present invention. Therefore, the protection scope of the present invention falls in the protection scope of the appended claims.

What is claimed is:

1. A base station handover method, comprising:
   sending, by a first base station, information of a first coordinated multi-point set of a user equipment to a second base station, wherein the information of the first coordinated multi-point set comprises identification information of each cell that constitutes the first coordinated multi-point set of the user equipment;
   receiving, by the first base station, information of a second coordinated multi-point set from the second base station, wherein the second coordinated multi-point set is a coordinated multi-point set allocated by the second base station for the user equipment in response to receiving the information of the first coordinated multi-point set, wherein the identification information of each cell of the first coordinated multi-point set is used by the second base station to determine a moving direction of the user equipment according to the identification information of each cell of the first coordinated multi-point set, and to allocate, according to an interference condition and a resource allocation condition in the moving direction, the second coordinated multi-point set for the user equipment; and
   sending, by the first base station, the information of the second coordinated multi-point set to the user equipment, so that the user equipment accesses a cell corresponding to the second coordinated multi-point set after being handed over to the second base station.

2. The method according to claim 1, wherein the information of the first coordinated multi-point set further comprises maximum transmission power of each cell that constitutes the first coordinated multi-point set of the user equipment; and
   wherein the maximum transmission power of each cell of the first coordinated multi-point set is used by the second base station to allocate downlink power for each cell of the second coordinated multi-point set according to the maximum transmission power of each cell of the first coordinated multi-point set.

3. The method according to claim 1, wherein the information of the second coordinated multi-point set comprises identification information of each cell that constitutes the second coordinated multi-point set of the user equipment and/or maximum transmission power of each cell that constitutes the second coordinated multi-point set of the user equipment;
  wherein the identification information of each cell of the second coordinated multi-point set is used to enable the user equipment to access a cell of the second coordinated multi-point set according to the identification information of each cell of the second coordinated multi-point set after the user equipment is handed over to the second base station; and
  wherein the maximum transmission power of each cell of the second coordinated multi-point set indicates a downlink power allocated by the second base station for each cell of the second coordinated multi-point set.

4. A base station handover method, comprising:
receiving, by a second base station, information of a first coordinated multi-point set of a user equipment from a first base station, wherein the information of the first coordinated multi-point set comprises identification information of each cell that constitutes the first coordinated multi-point set of the user equipment;
in response to receiving the information of the first coordinated multi-point set, determining, by the second base station, a moving direction of the user equipment according to the identification information of each cell of the first coordinated multi-point set, and allocating a second coordinated multi-point set for the user equipment according to an interference condition and a resource allocation condition in the moving direction, wherein the second coordinated multi-point set is used to enable the user equipment to access a cell corresponding to the second coordinated multi-point set after the user equipment is handed over to the second base station; and
sending, by the second base station, information of the second coordinated multi-point set to the first base station.

5. The method according to claim 4, wherein the information of the first coordinated multi-point set further comprises maximum transmission power of each cell that constitutes the first coordinated multi-point set of the user equipment; and
  wherein the maximum transmission power of each cell of the first coordinated multi-point set is used by the second base station to allocate downlink power for each cell of the second coordinated multi-point set according to the maximum transmission power of each cell of the first coordinated multi-point set.

6. The method according to claim 4, wherein the information of the second coordinated multi-point set comprises identification information of each cell that constitutes the second coordinated multi-point set of the user equipment and/or maximum transmission power of each cell that constitutes the second coordinated multi-point set of the user equipment;
  wherein the identification information of each cell of the second coordinated multi-point set is used to enable the user equipment to access a cell of the second coordinated multi-point set according to the identification information of each cell of the second coordinated multi-point set after the user equipment is handed over to the second base station; and
  wherein the maximum transmission power of each cell of the second coordinated multi-point set indicates a downlink power allocated by the second base station for each cell of the second coordinated multi-point set.

7. A base station handover method, comprising:
receiving, by a user equipment, information of a second coordinated multi-point set from a first base station, wherein the second coordinated multi-point set is received by the first base station from a second base station, the second coordinated multi-point set is allocated by the second base station for the user equipment in response to the second base station receiving information of a first coordinated multi-point set, the information of the first coordinated multi-point set comprises identification information of each cell that constitutes the first coordinated multi-point set of the user equipment, and wherein the identification information of each cell of the first coordinated multi-point set is used by the second base station to determine a moving direction of the user equipment according to the identification information of each cell of the first coordinated multi-point set and to allocate the second coordinated multi-point set for the user equipment according to an interference condition and a resource allocation condition in the moving direction, and the first coordinated multi-point set is a coordinated multi-point set corresponding to a cell currently accessed by the user equipment;
handing over the user equipment from the first base station to the second base station; and
accessing, by the user equipment, according to the information of the second coordinated multi-point set, a cell corresponding to the second coordinated multi-point set.

8. The method according to claim 7, wherein the information of the first coordinated multi-point set further comprises maximum transmission power of each cell that constitutes the first coordinated multi-point set of the user equipment; and
  wherein the maximum transmission power of each cell of the first coordinated multi-point set is used by the second base station to allocate downlink power for each cell of the second coordinated multi-point set according to the maximum transmission power of each cell of the first coordinated multi-point set.

9. The method according to claim 7, wherein the information of the second coordinated multi-point set comprises identification information of each cell that constitutes the second coordinated multi-point set of the user equipment and/or maximum transmission power of each cell that constitutes the second coordinated multi-point set of the user equipment;
  wherein the identification information of each cell of the second coordinated multi-point set is used to enable the user equipment to access a cell of the second coordinated multi-point set according to the identification information of each cell of the second coordinated multi-point set after the user equipment is handed over to the second base station; and
  wherein the maximum transmission power of each cell of the second coordinated multi-point set indicates a downlink power allocated by the second base station for each cell of the second coordinated multi-point set.

10. A base station comprising:
a transmitter, configured to send information of a first coordinated multi-point set of a user equipment to a second base station, wherein the information of the first coordinated multi-point set sent by the transmitter comprises identification information of each cell that constitutes the first coordinated multi-point set of the user equipment;

a receiver, configured to receive, from the second base station, information of a second coordinated multi-point set, which is corresponding to the information of the first coordinated multi-point set sent by the transmitter, wherein the identification information of each cell of the first coordinated multi-point set is used by the second base station to determine a moving direction of the user equipment according to the identification information of each cell of the first coordinated multi-point set, and to allocate the second coordinated multi-point set for the user equipment according to an interference condition and a resource allocation condition in the moving direction; and wherein the transmitter is further configured to send the information of the second coordinated multi-point set to the user equipment, so that the user equipment accesses a cell corresponding to the second coordinated multi-point set after being handed over to the second base station.

11. The base station according to claim 10, wherein the information of the first coordinated multi-point set sent by the transmitter further comprises maximum transmission power of each cell that constitutes the first coordinated multi-point set of the user equipment; and wherein the maximum transmission power of each cell of the first coordinated multi-point set is used by the second base station to allocate downlink power for each cell of the second coordinated multi-point set according to the maximum transmission power of each cell of the first coordinated multi-point set.

12. The base station according to claim 11, wherein the identification information of each cell of the first coordinated multi-point set comprises an identity of each cell that constitutes the first coordinated multi-point set and/or coordinates of a remote radio head.

13. The base station according to claim 10, wherein the information of the second coordinated multi-point set sent by the transmitter comprises identification information of each cell that constitutes the second coordinated multi-point set of the user equipment and/or maximum transmission power of each cell that constitutes the second coordinated multi-point set of the user equipment;

wherein the identification information of each cell of the second coordinated multi-point set is used to enable the user equipment to access a cell of the second coordinated multi-point set according to the identification information of each cell of the second coordinated multi-point set after the user equipment is handed over to the second base station; and wherein the maximum transmission power of each cell of the second coordinated multi-point set indicates a downlink power allocated by the second base station for each cell of the second coordinated multi-point set.

14. The base station according to claim 10, wherein the transmitter is configured to send the information of the first coordinated multi-point set to the second base station by sending the information of the first coordinated multi-point set to the second base station through a handover request instruction; and wherein the receiver is configured to receive the information of the second coordinated multi-point set from the second base station by receiving the information of the second coordinated multi-point set from the second base station through a handover request response.

15. A base station comprising:
a receiver, configured to:
receive information of a first coordinated multi-point set of user equipment from a first base station, wherein the information of the first coordinated multi-point set received by the receiver comprises identification information of each cell that constitutes the first coordinated multi-point set of the user equipment; and in response to receiving the information of the first coordinated multi-point set, determine a moving direction of the user equipment according to the identification information of each cell of the first coordinated multi-point set, and allocate the second coordinated multi-point set for the user equipment according to an interference condition and a resource allocation condition in the moving direction; and a transmitter, configured to send information of the second coordinated multi-point set to the first base station, wherein the second coordinated multi-point set is used to enable the user equipment to access a cell corresponding to the second coordinated multi-point set after the user equipment is handed over to the base station.

16. The base station according to claim 15, wherein the information of the first coordinated multi-point set received by the receiver further comprises maximum transmission power of each cell that constitutes the first coordinated multi-point set of the user equipment;

wherein the maximum transmission power of each cell of the first coordinated multi-point set is used by the base station to allocate downlink power for each cell of the second coordinated multi-point set according to the maximum transmission power of each cell of the first coordinated multi-point set.

17. The base station according to claim 15, wherein the information of the second coordinated multi-point set sent by the transmitter comprises identification information of each cell that constitutes the second coordinated multi-point set of the user equipment and/or maximum transmission power of each cell that constitutes the second coordinated multi-point set of the user equipment;

wherein the identification information of each cell of the second coordinated multi-point set is used to enable the user equipment to access a cell of the second coordinated multi-point set according to the identification information of each cell of the second coordinated multi-point set after the user equipment is handed over to the base station; and wherein the maximum transmission power of each cell of the second coordinated multi-point set indicates a downlink power allocated by the base station for each cell of the second coordinated multi-point set.

18. The base station according to claim 15, wherein the receiver is configured to receive the information of the first coordinated multi-point set of the user equipment from the first base station by receiving the information of the first coordinated multi-point set of the user equipment from the first base station through a handover request instruction; and wherein the transmitter is configured to send the information of the second coordinated multi-point set to the first base station by sending the information of the second coordinated multi-point set to the first base station through a handover request response instruction.

19. A user equipment, comprising:
a receiver, configured to receive information of a second coordinated multi-point set from a first base station, wherein the second coordinated multi-point set is received by the first base station from a second base station, the second coordinated multi-point set is allocated by the second base station for the user equipment in response to receiving the information of the first coordinated multi-point set, the information of the first coordinated multi-point set comprises identification information of each cell that constitutes the first coordinated multi-point set of the user equipment, wherein the identification information of each cell of the first coordinated multi-point set is used by the second base station to determine a moving direction of the user equipment according to the identification information of each cell of the first coordinated multi-point set, and to allocate the second coordinated multi-point set for the user equipment according to an interference condition and a resource allocation condition in the moving direction, and the first coordinated multi-point set is a coordinated multi-point set corresponding to a cell currently accessed by the user equipment; and a processor, configured to be handed over from the first base station to the second base station, and to access a cell corresponding to the second coordinated multi-point set according to the information of the second coordinated multi-point set.

20. The user equipment according to claim 19, further comprising a transmitter, which is configured to send a complete message to the second base station to indicate that the handover is completed.

\* \* \* \* \*